United States Patent
Haghighat et al.

(10) Patent No.: US 12,237,906 B2
(45) Date of Patent: Feb. 25, 2025

(54) METHODS FOR MSG-B IN TWO-STEP RACH

(71) Applicant: INTERDIGITAL PATENT HOLDINGS, INC., Wilmington, DE (US)

(72) Inventors: Afshin Haghighat, Ile-Bizard (CA); Shahrokh Nayeb Nazar, San Diego, CA (US); Loic Canonne-Velasquez, Dorval (CA); Faris Alfarhan, Montreal (CA); J. Patrick Tooher, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 246 days.

(21) Appl. No.: 17/429,846

(22) PCT Filed: Feb. 13, 2020

(86) PCT No.: PCT/US2020/018146
§ 371 (c)(1),
(2) Date: Aug. 10, 2021

(87) PCT Pub. No.: WO2020/168103
PCT Pub. Date: Aug. 20, 2020

(65) Prior Publication Data
US 2022/0190906 A1    Jun. 16, 2022

Related U.S. Application Data

(60) Provisional application No. 62/930,911, filed on Nov. 5, 2019, provisional application No. 62/908,883, filed on (Continued)

(51) Int. Cl.
*H04B 7/08* (2006.01)
*H04L 5/00* (2006.01)
(Continued)

(52) U.S. Cl.
CPC ........... *H04B 7/088* (2013.01); *H04L 5/0051* (2013.01); *H04W 24/08* (2013.01); *H04W 24/10* (2013.01);
(Continued)

(58) Field of Classification Search
CPC ...... H04B 7/088; H04W 76/19; H04W 24/08; H04W 24/10; H04W 74/0841; H04L 5/0051
See application file for complete search history.

(56) References Cited

U.S. PATENT DOCUMENTS 6,195,037 B1    2/2001  Gross et al.
2012/0300715 A1  11/2012  Pelletier et al.
(Continued)

FOREIGN PATENT DOCUMENTS

WO    2018/204255       11/2018
WO    WO-2018204255 A1 * 11/2018    ............... H04B 7/00

OTHER PUBLICATIONS

Third Generation Partnership Project, "Technical Specification Group Radio Access Network; NR; Medium Access Control (MAC) protocol specification (Release 15)," 3GPP TS 38.321 V15.4.0 (Dec. 2018).
(Continued)

*Primary Examiner* — Brenda H Pham
(74) *Attorney, Agent, or Firm* — Volpe Koenig

(57) ABSTRACT

Methods and apparatus for transmitting a hybrid automatic repeat request acknowledgment (HARQ-ACK) are disclosed. A wireless transmit/receive unit (WTRU) may transmit a random access channel (RACH) message-A to a gNB. The WTRU may receive a RACH message-B from the gNB in response to the message-A. The message-B may comprise downlink control information (DCI). The WTRU may decode a physical downlink shared channel (PDSCH) based
(Continued)

on the DCI. The WTRU may determine that contention resolution is successful. The WTRU may determine a resource for a physical uplink control channel (PUCCH). The WTRU may transmit a HARQ-ACK over the determined PUCCH resource. The WTRU may determine the resource for the PUCCH based on a PUCCH resource index. The PUCCH resource index may be based on a random access preamble index (RAPID) and a PUCCH resource indicator (PRI).

14 Claims, 11 Drawing Sheets

Related U.S. Application Data on Oct. 1, 2019, provisional application No. 62/840,647, filed on Apr. 30, 2019, provisional application No. 62/805,084, filed on Feb. 13, 2019.

(51) Int. Cl.
  *H04W 24/08*   (2009.01)
  *H04W 24/10*   (2009.01)
  *H04W 74/0833* (2024.01)
  *H04W 76/19*   (2018.01)
(52) U.S. Cl.
  CPC ....... *H04W 74/0841* (2013.01); *H04W 76/19* (2018.02)

(56) References Cited

U.S. PATENT DOCUMENTS

| | | | |
|---|---|---|---|
| 2018/0278467 A1 | 9/2018 | Wilson et al. | |
| 2018/0368124 A1 | 12/2018 | Liu et al. | |
| 2018/0368126 A1* | 12/2018 | Islam | H04L 5/1469 |
| 2018/0375556 A1 | 12/2018 | Wang et al. | |

OTHER PUBLICATIONS

Third Generation Partnership Project, "Technical Specification Group Radio Access Network; NR; Medium Access Control (MAC) protocol specification (Release 15)," 3GPP TS 38.321 V15.8.0 (Dec. 2019).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
Interdigital, "On fallback to 4-step RA," 3GPP RAN WG2 Meeting #106, R2-1906406, Reno, USA (May 13-17, 2019).
Interdigital, "Fallback procedure to 4-step RA," 3GPP RAN WG2 Meeting #107, R2-1909607, Prague, Czech Republic (Aug. 26-30, 2019).
Ericsson, "Back-off for 2-step RA," 3GPP RAN WG2 Meeting #107, R2-1909935, Prague, Czech Republic (Aug. 26-30, 2019).
Huawei et al., "Discussion on beam failure recovery for SCell," 3GPP TSG-RAN WG2 Meeting 102, R2-1807975, Busan, Korea (May 21-25, 2018).
Third Generation Partnership Project, "Technical Specification Group Radio Access Network; NR; NR and NG-RAN Overall Description; Stage 2 (Release 15)," 3GPP TS 38.300 V15.4.0 (Dec. 2018).
Third Generation Partnership Project, "Technical Specification Group Radio Access Network; NR; NR and NG-RAN Overall Description; Stage 2 (Release 15)," 3GPP TS 38.300 V15.8.0 (Dec. 2019).
Third Generation Partnership Project, "Technical Specification Group Radio Access Network; NR; NR and NG-RAN Overall Description; Stage 2 (Release 16)," 3GPP TS 38.300 V16.0.0 (Dec. 2019).
Samsung, "MAC Impacts: Beam Failure Recovery for SCell," 3GPP TSG-RAN2 101bis, R2-1804303, Sanya, China (Apr. 16-20, 2018).
Fujitsu et al., "Dedicated preamble support in 2-step Rach," 3GPP TSG-RAN WG2 Meeting #107, R2-1911402, Prague, Czech Republic (Aug. 26-30, 2019).
Huawei et al., "Discussion on the content for successRAR," 3 GPP TSG-RAN WG2 Meeting #107, R2-1910671, Prague, Czech (Aug. 26-30, 2019).
Nokia et al., "Applicable triggers for 2-step Rach," 3GPP TSG-RAN WG2 Meeting #105bis, R2-1904031, Xian, China (Apr. 8-12, 2019).
Qualcomm Incorporated, "Procedure and format for beam index indication MAC CE," 3GPP TSG-RAN WG2 Meeting #107, R2-1911504, Prague, Czech (Aug. 26-30, 2019).
Third Generation Partnership Project, "Technical Specification Group Radio Access Network; NR; Physical layer procedures for control (Release 15)," 3GPP TS 38.213 V15.4.0 (Dec. 2018).
Third Generation Partnership Project, "Technical Specification Group Radio Access Network; NR; Physical layer procedures for control (Release 15)," 3GPP TS 38.213 V15.8.0 (Dec. 2019).
Third Generation Partnership Project, "Technical Specification Group Radio Access Network; NR; Physical layer procedures for control (Release 15)," 3GPP TS 38.213 V16.0.0 (Dec. 2019).
Third Generation Partnership Project, "Technical Specification Group Radio Access Network; NR; Requirements for support of radio resource management (Release 15)," 3GPP TS 38.133 V15.8.0 (Dec. 2019).
Third Generation Partnership Project, "Technical Specification Group Radio Access Network; NR; Requirements for support of radio resource management (Release 15)," 3GPP TS 38.133 V15.4.0 (Dec. 2018).
Third Generation Partnership Project, "Technical Specification Group Radio Access Network; NR; Requirements for support of radio resource management (Release 16)," 3GPP TS 38.133 V16.2.0 (Dec. 2019).

* cited by examiner

METHODS FOR MSG-B IN TWO-STEP RACH

CROSS-REFERENCE TO RELATED APPLICATIONS

This application is the U.S. National Stage, under 35 U.S.C. § 371, of International Application No. PCT/US2020/018146, filed Feb. 13, 2020, which claims the benefit of U.S. Provisional Application No. 62/805,084, filed Feb. 13, 2019, U.S. Provisional Application No. 62/840,647, filed Apr. 30, 2019, U.S. Provisional Application No. 62/908,883, filed Oct. 1, 2019, and U.S. Provisional Application No. 62/930,911, filed Nov. 5, 2019, the contents of which are incorporated herein by reference.

BACKGROUND

Within wireless communication technologies, there is a random access channel (RACH) procedure for a device attempting to connect to a network. For example, the RACH procedure may be prompted by triggers that initiate a RACH procedure, such as synchronization acquisition or handover. There is a need to improve upon this process.

SUMMARY

Methods and apparatus for transmitting a hybrid automatic repeat request acknowledgment (HARQ-ACK) are disclosed. A wireless transmit/receive unit (WTRU) may transmit a random access channel (RACH) message-A to a gNB. The WTRU may receive a RACH message-B from the gNB in response to the message-A. The message-B may comprise downlink control information (DCI). The WTRU may decode a physical downlink shared channel (PDSCH) based on the DCI. The WTRU may determine that contention resolution is successful. The WTRU may determine a resource for a physical uplink control channel (PUCCH). The WTRU may transmit a HARQ-ACK over the determined PUCCH resource. The WTRU may determine the resource for the PUCCH based on a PUCCH resource index. The PUCCH resource index may be based on a random access preamble index (RAPID) and a PUCCH resource indicator (PRI). The WTRU may determine a slot timing for transmitting the HARQ-ACK. The slot timing may be based on a PDSCH-to-HARQ feedback indicator and the RAPID.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
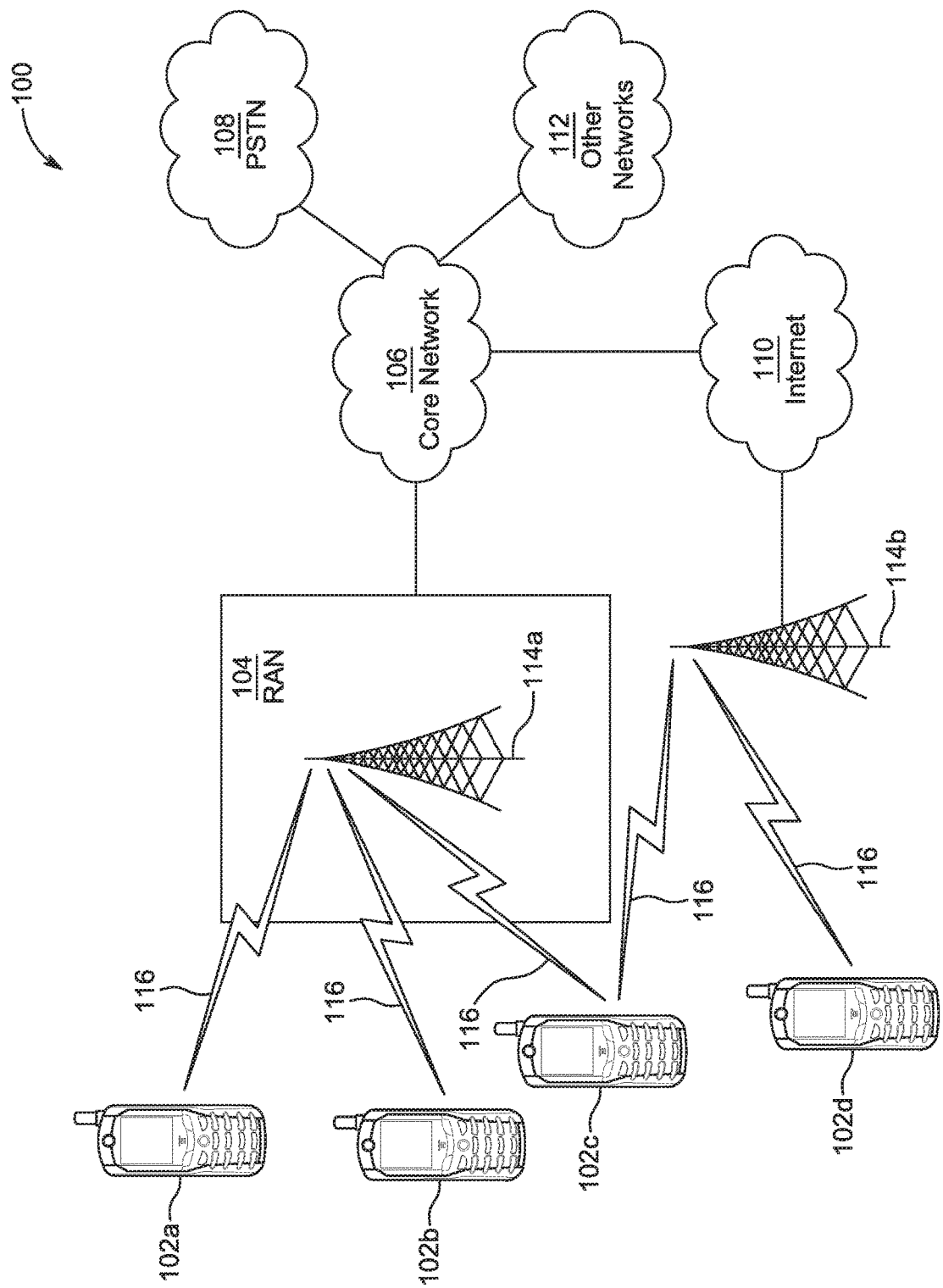
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple-output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing an NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
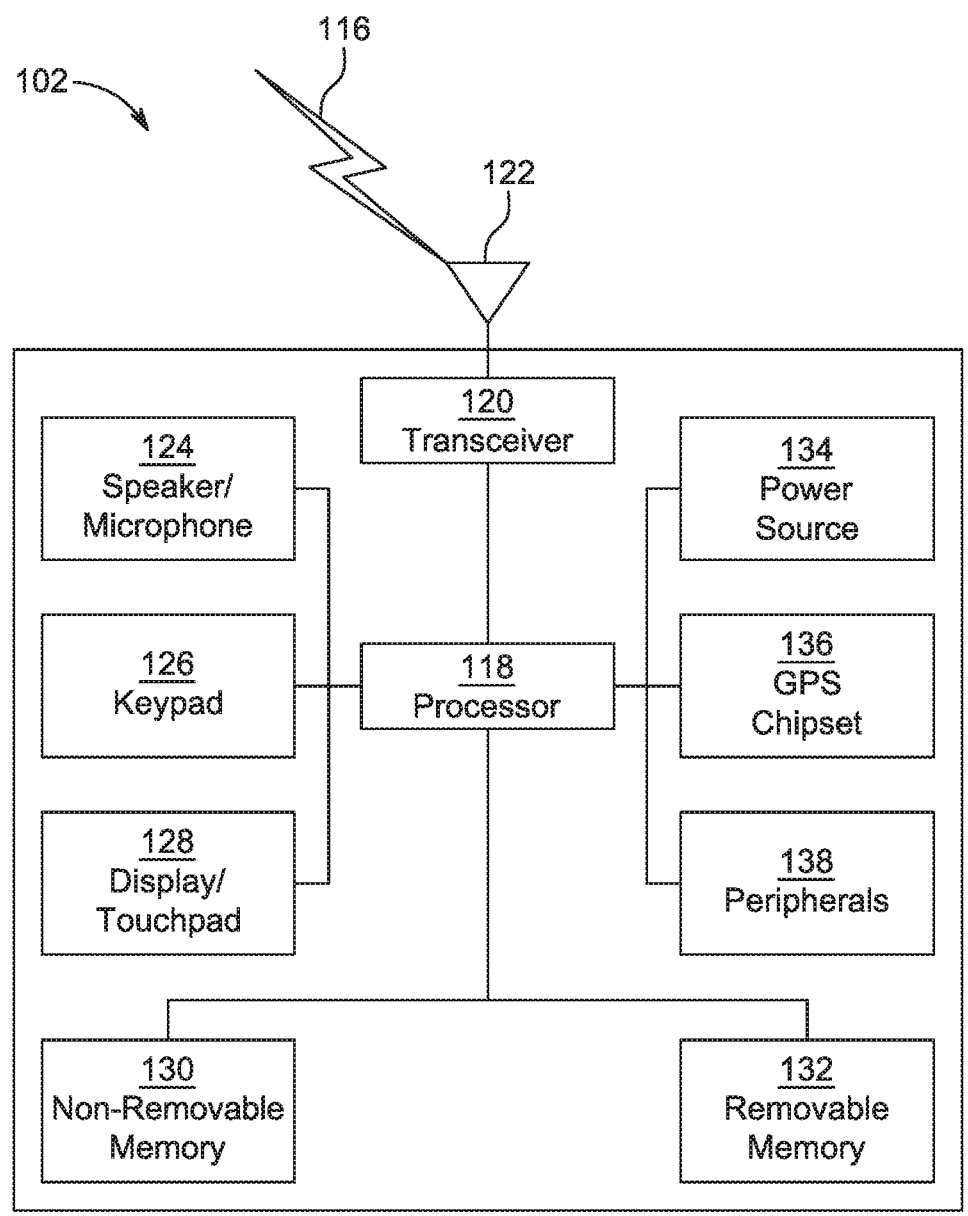
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general-purpose processor, a special-purpose processor, a conventional processor, a digital signal processor (DSP), a plurality of microprocessors, one or more microprocessors in association with a DSP core, a controller, a microcontroller, Application-Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel-metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands-free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full-duplex radio for which transmission and reception of some or all of the signals (e.g., associated with particular subframes for both the UL (e.g., for transmission) and DL (e.g., for reception) may be concurrent and/or simultaneous. The full-duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
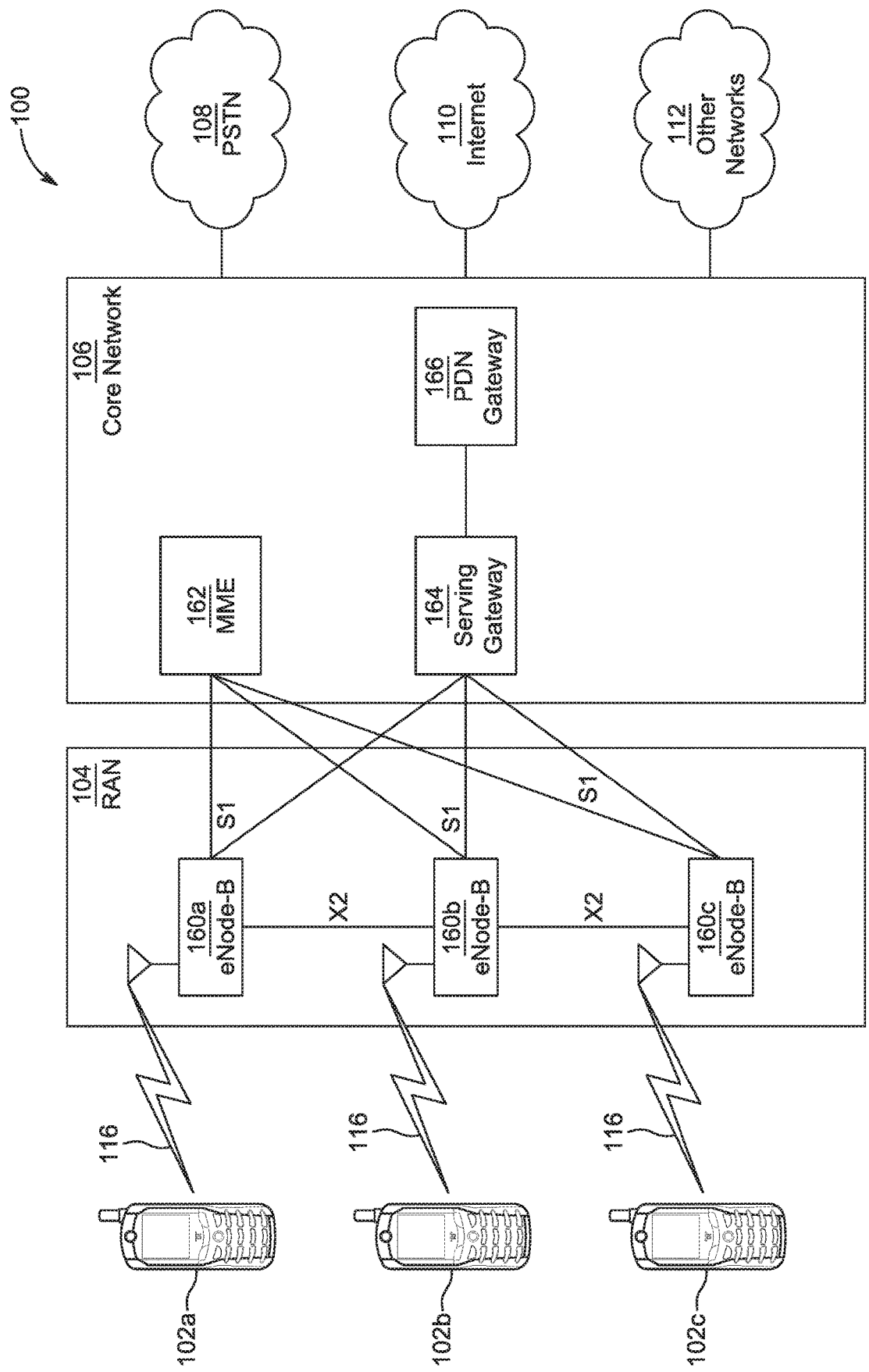
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c, and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c, and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP, and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11 ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example, in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time-domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities, including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by an STA, from among all STAs in operating in a BSS, which supports the smallest bandwidth operating mode. In the example of 802.11 ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to an STA (which supports only a 1 MHz operating mode) transmitting to the AP, all available frequency bands may be considered busy even though a majority of the available frequency bands remains idle.

In the United States, the available frequency bands, which may be used by 802.11 ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz, depending on the country code.

Figure 1D:
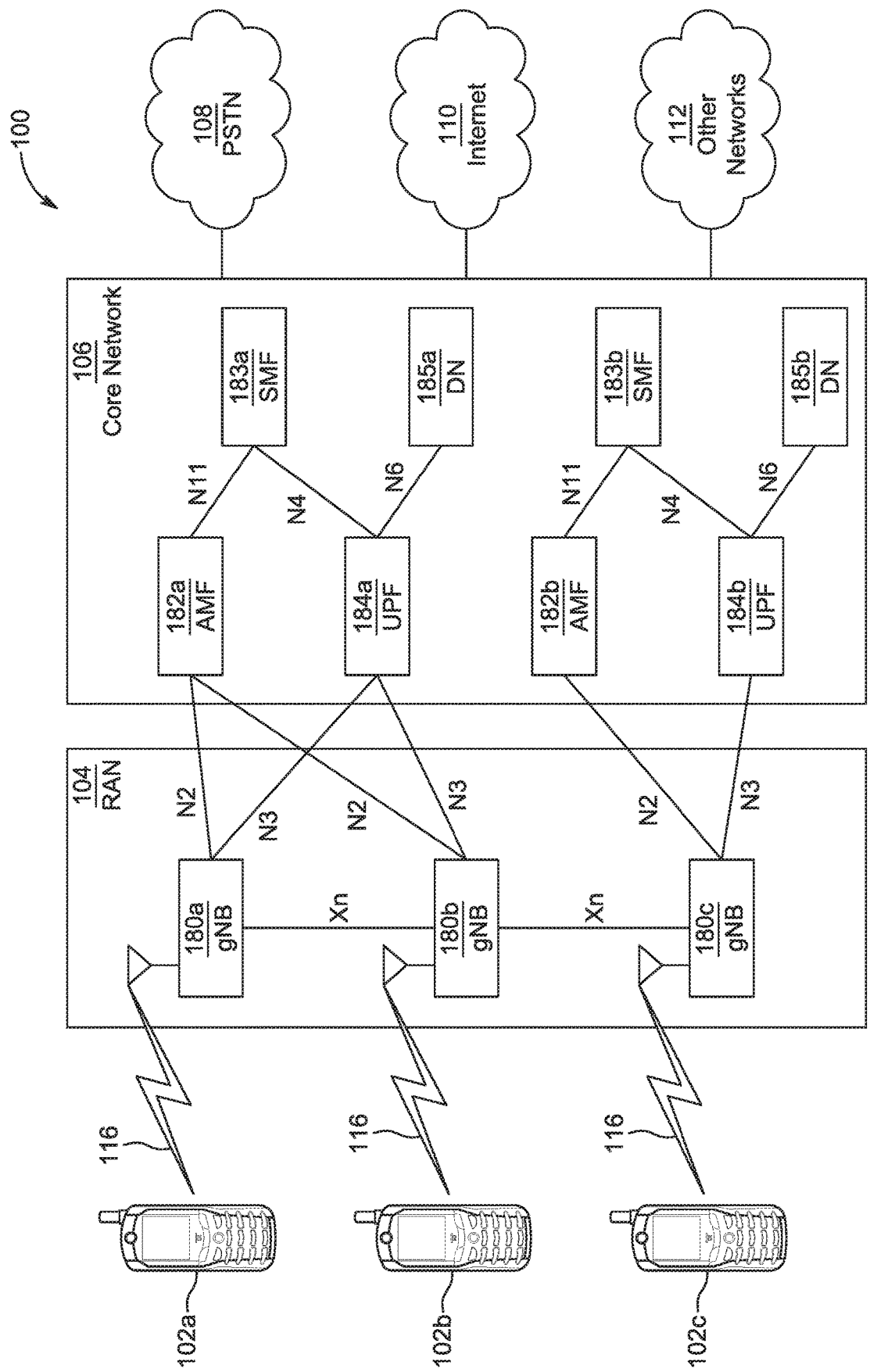
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b, and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Generally, for any given wireless system (e.g., LTE, NR, etc.), such as those described in FIGS. 1A, 1C, and 1D, a WTRU may access a network using a random access procedure (e.g., once a cell is found, handover synchronization, reestablishing uplink synchronization, request scheduling, etc.). In some cases (e.g., LTE) there may be a 4-step Random Access Channel (RACH) procedure with four messages (msg) exchanged between a WTRU and a base station (e.g., network/cell).

Figure 2:
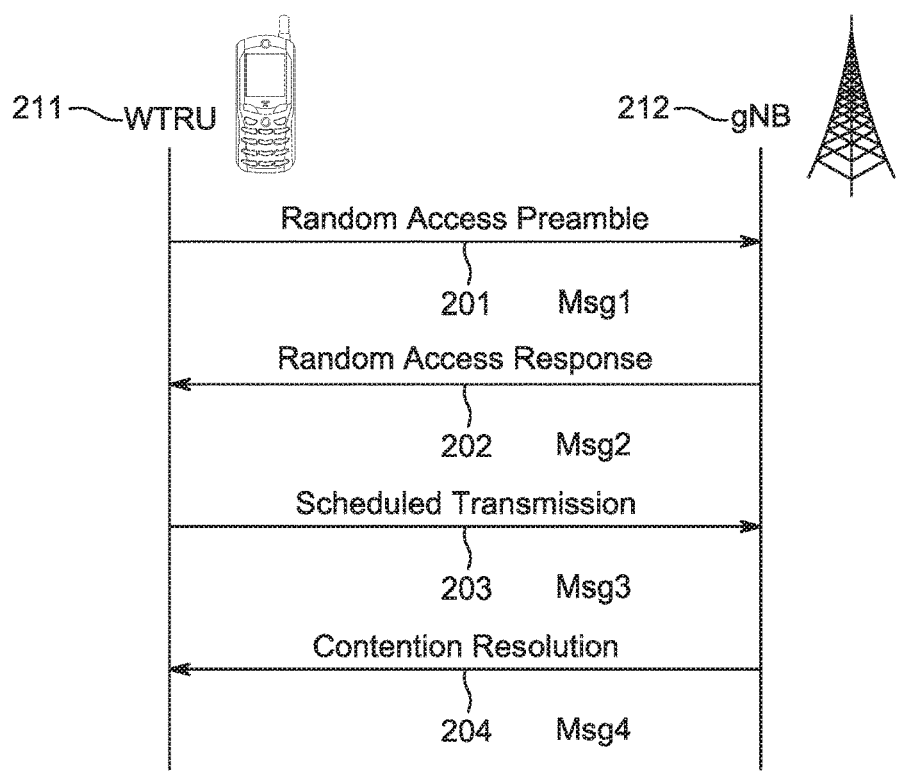
FIG. 2 is a process diagram illustrating an example information exchange between a WTRU and a gNB for a 4-step RACH procedure.

FIG. 2 is a process diagram illustrating an example exchange between a WTRU 211 and a gNB 212 for a 4-step RACH procedure. At 201, the WTRU 211 may send msg1, which may be a randomly selected random access preamble sequence and may be transmitted during a Physical RACH (PRACH) opportunity. The WTRU 211 may monitor a control channel for msg2 (e.g., a random access response).

Once the gNB 212 receives msg1, the gNB 212 may reply with msg2 at 202, which may include a random access response (RAR). The RAR may include Downlink Control Information (DCI) scrambled with a Random Access-Radio Network Temporary Identifier (RA-RNTI) corresponding to the PRACH occasion in which the preamble is transmitted. The DCI may contain a RAR grant that may include the time and frequency resource allocation for the WTRU 211, along with a modulation and coding scheme (MCS) and a transmit power control (TPC) command. The msg2 may also contain a preamble index so that the WTRU 211 may confirm that the RAR is intended for itself (WTRU 211). Once the WTRU 211 receives msg2, including the RAR, the WTRU 211 decodes it.

At 203, based on everything that was processed from msg2, the WTRU 211 may proceed with the transmission of a data packet (e.g., PDU). The WTRU 211 may scramble the data with a Temporary Cell-Radio Network Temporary Identifier (TC-RNTI) and send it as msg3 according to scheduled resources given in the RAR grant.

At 204, the gNB 212 may reply with msg4 that may be a contention resolution message. Upon reception of msg4, the WTRU 211 may compare its TC-RNTI sent in msg3 with the WTRU identity received in msg4. Contention may occur when two WTRUs select the same preamble and they both monitor the same RAR grant that leads the WTRUs to transmit msg3 on the same resources. In the event of a collision, WTRUs may attempt another RACH procedure. The last two messages, msg3 and msg4, may assist with collision resolution.

In a different approach, the RACH procedure may be completed with just two messages, which may simplify the 4-step RACH procedure to a 2-step RACH procedure. As discussed herein, a RACH procedure may also be referred to as Random Access (RA) procedure, or #-step RA (where the # is 2 or 4).

Generally, the information associated with each msg # may be interchangeable as described herein (e.g., msg 1 refers to the random access preamble, and so on).

Figure 3:
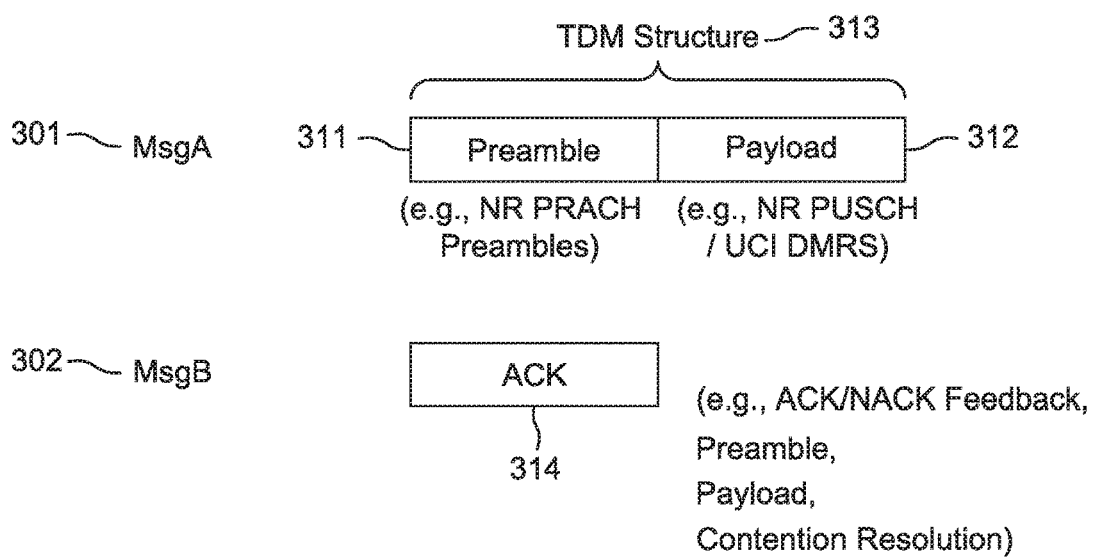
FIG. 3 is a diagram illustrating an example baseline for a signal structure for 2-step RA.

FIG. 3 is a diagram illustrating an example baseline for a signal structure for 2-step RACH. In this 2-step RACH procedure, the first msgA 310 may include msg1 (e.g., a preamble 311) and msg3 (e.g., a payload 312) sent together. As shown, msgA may be comprised of a preamble 311 (e.g., NR PRACH preambles) and a payload 312. Further, msgA may be time-division multiplexed (TDM) 313 with the payload 312 being transmitted on a NR PUSCH using a NR demodulation reference signal (DMRS). In the second step, msgB 320 may include msg2 and msg4. The single step of msgB may accomplish the functions of msg2 and msg4, and may include control information. For example, the control information may be one or more of the following: an ACK/NACK that may be in response to the preamble, the payload, or both; timing advance (TA) that may be according to a preconfigured table, requiring only an index; PUSCH scheduling information that may be defined according to a preconfigured table, requiring only an index; preamble selection that may be a flag, where its presence initiates a preamble reselection; MCS that may be limited to a few basic options; power adjustment that may be in form of TPC, and/or a flag, where the flag's presence indicates to increase power by a pre-configured value.

Generally, in a 2-step RACH procedure, the msgB process and its indication mechanism may perform an equivalent or similar function as the 4-step msg2 and msg4 while addressing possible use cases of 2-step RACH. However, in a 2-step RACH approach there may be one or more issues that arise as a result of combining msg2 and msg4 into one step of msgB. These issues may include: low overhead indication mechanism to support contention resolution; a mechanism for ACK/NACK indication and determination for msgA; a mechanism for Group Common/WTRU-specific ACK/NACK indication and determination; and/or, a mechanism for monitoring msgB and switching between 2-step RA and 4-step RA. These issues may be addressed in one or more embodiments herein.

Figure 4:
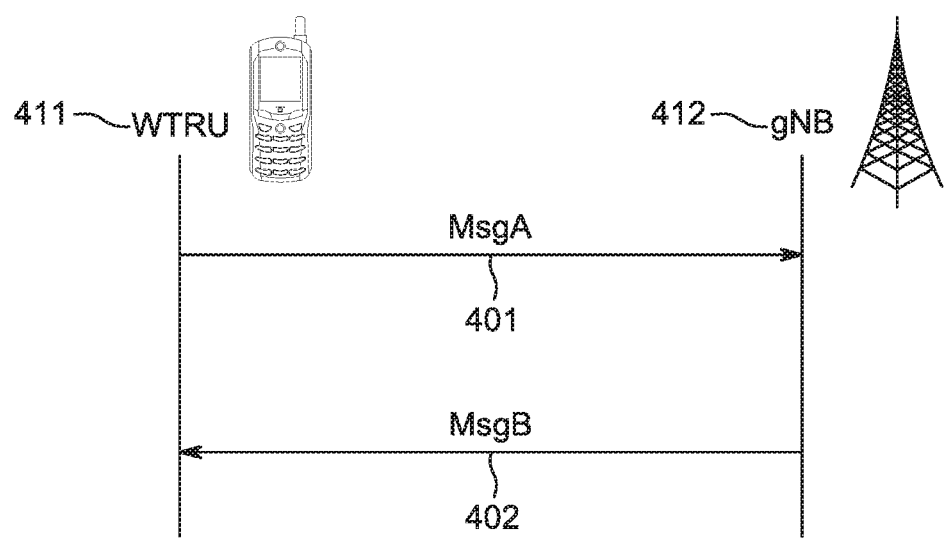
FIG. 4 is a process diagram illustrating an example of information exchange between a WTRU and a gNB for a 2-step RACH procedures

FIG. 4 is a process diagram illustrating an example of 2-step RACH. WTRU 411 transmits msgA at 401. Upon receiving msgA, the gNB 412 may process the preamble to determine a correct timing of a boundary of the received payload. The gNB 412 may process the payload, using the determined timing, for detection and decoding. The gNB 412 may then send msgB at 402 in response to attempting to, or fully, processing msgA.

If the payload is decoded successfully, the WTRU may receive an acknowledgment message in msgB indicating that msgA has been successfully decoded.

In some cases, the WTRU may receive an update for TA in msgB to be applied for potential follow up transmissions. The WTRU may receive other transmission parameters (e.g., a TPC command for the preamble part of msgA, a TPC command for the payload part of msgA, or a TPC command for both).

If the payload is not decoded successfully by the gNB, the WTRU may receive a control message in msgB to update its TA value. Such a control message may be addressed to a preamble group. For example, the control message, or a component thereof (e.g., a CRC), may be scrambled using an identifier tied to the preamble group. In some cases, the preamble group may be defined based on an estimated distance inferred from WTRU measurements (e.g., pathloss, etc.). In some cases, the control message may be broadcast and may include an identity of the preamble group. The WTRU may also, or alternatively, receive other control information (e.g., a TPC command for the preamble part of msgA, a TPC command for the payload part of msgA, or a TPC command for both).

In some cases, the WTRU may be configured with (e.g., configured during initial access as part of the SIB) one or more CORESETs and/or search spaces, where one CORESET and/or search space may be dedicated for receiving a preamble group PDCCH. The WTRU may determine at least one parameter of the CORESET and/or search space (e.g., the timing thereof) based on a parameter of the preamble and/or random access resource used to transmit the preamble. In some cases, a WTRU may retransmit the payload with the received configuration.

The WTRU may receive a message that includes a grant for a retransmission of the payload in msgB. The grant may indicate to the WTRU that the preamble was received without ambiguity, but that the payload needs to be retransmitted. In some cases, the network may provide parameters for the retransmission in msgB. The indicated parameters may be indicated directly, or they may be relative to the original transmission. For example, the retransmission grant may indicate to reduce the MCS from the one used in the original transmission.

As discussed herein, the payload of msgA may be composed of at least two parts, such as a UCI and data. The UCI may be used by the WTRU to indicate parameters of the transmission of the data (e.g., MCS, DM-RS configuration, resource allocation, TCI state, and the like). The gNB may decode the UCI but may determine a NACK for the data portion of the transmission. The WTRU may receive an indication in msgB to retransmit the data, without a UCI. For example, the indication may provide a new set of transmission parameters that override those selected by the WTRU for the original transmission.

In a case of unlicensed operation, the WTRU may receive an indication that the transmission failed due to a hidden node issue. Such an indication may be used to indicate to the WTRU to use a more robust Listen Before Talk (LBT) procedure or to retransmit with greater power.

If the WTRU does not receive a control message within a specified period, it may restart the process. For a retransmission, the WTRU may modify a parameter of the preamble and/or the payload. For example, power ramping may be used for the preamble and/or the payload.

The received msgB may contain an information element. An information element may be in a form of a decoded DCI, PDSCH message, a sequence, or a combination thereof. In some cases, the information element may be composed of at least one or more of the information discussed herein. In some cases, the content of the information element may be quantized or classified based on the dimension of its content to point to a specific value or a combination of values for multiple pieces of information.

In some cases, an information element may be an N bit binary message that may support $2^N$ different dimensions or states. In some cases, an information element may be selected from a pool of M sequences, supporting at most M different dimensions or states. In an example, different states of an information element may point to different values of TA. In some cases, the different states of the information element may determine different combinations of two or more of the contents (e.g., ACK/NACK, TA, etc.).

The success of a msgA transmission depends on the successful transmission of the preamble and payload parts. For a retransmission of msgA, it may be desirable to know which part of msgA has failed so that proper adjustments for a re-transmission may be made. It may be possible to have separate ACK/NACK feedback for the preamble and the payload, however, it may require excessive overhead and delay in the process.

Figure 5:
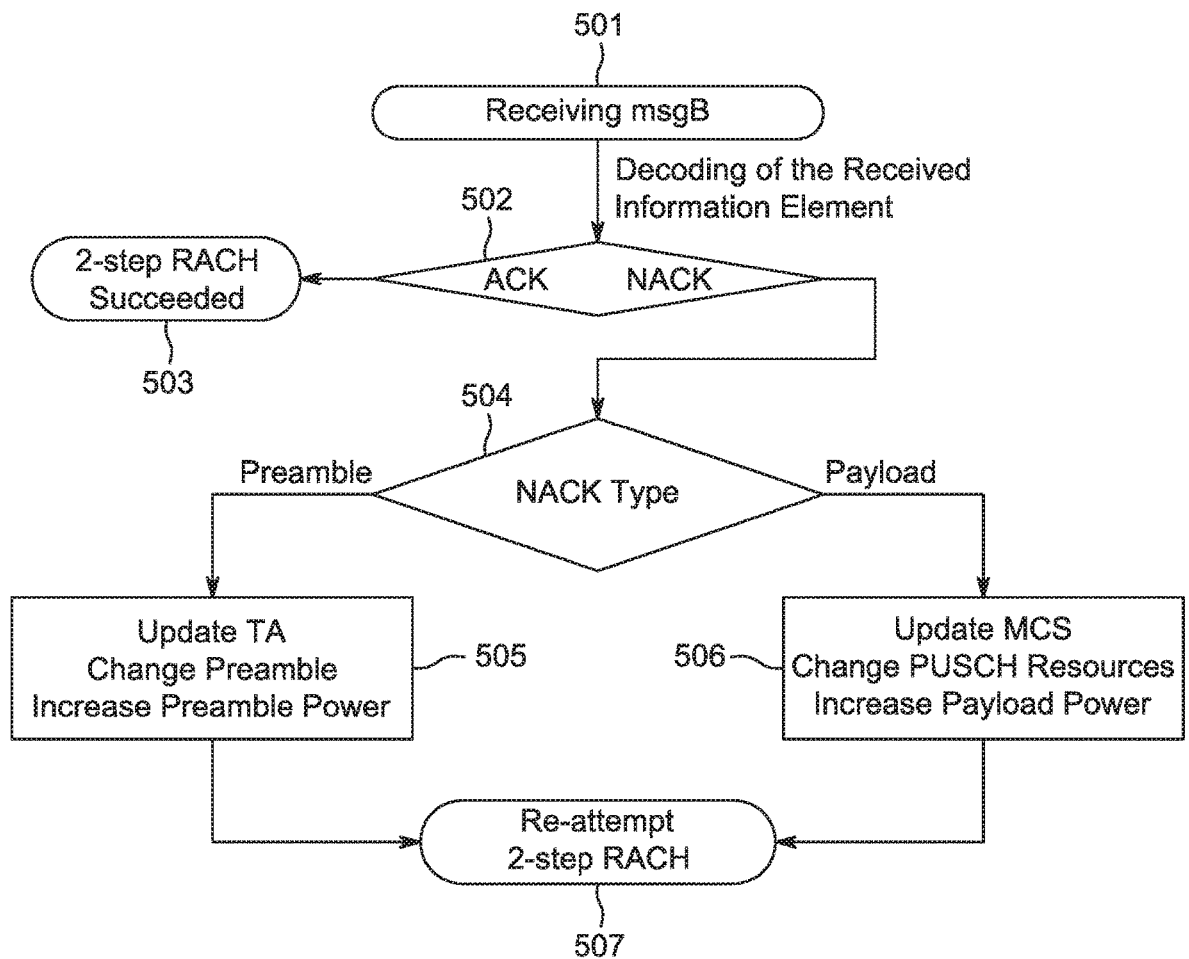
FIG. 5 is a flow diagram illustrating an example of WTRU behavior for an efficient ACK/NACK process.

FIG. 5 is a flow diagram illustrating an example of WTRU behavior for an efficient ACK/NACK process.

Generally, a WTRU may receive one or more 2RA-RNTI values that may be used for the 2-step RACH. The 2RA-RNTI may be a subset of RA-RNTI or a different set. In one instance, at least one of the 2RA-RNTI is reserved for the preamble NACK. A WTRU may select one of the configured preambles for msgA transmission. A selected preamble may be identified by a preamble ID. In one instance, a WTRU may select one of the configured preambles according to one of the received RA-RNTI and/or another system parameter.

Initially, the gNB may receive msgA from a WTRU. At 501, the gNB may send a msgB back to the WTRU. At 502, the WTRU may determine whether there is an ACK or a NACK in the msgB.

If the gNB successfully detects the preamble and the payload, then the msgB contains an ACK indicating a successful 2-step RACH 503.

If the gNB detects the preamble but fails in decoding the payload, then at 504 the WTRU processes the msgB that contains a NACK and a preamble ID indicating successful detection of the preamble, but a failure in decoding the payload. The preamble ID of the detected preamble may be indicated explicitly or implicitly. In some cases, the preamble ID may be indicated directly as the content of the msgB. In some cases, the preamble ID may be used for scrambling the CRC of the received msgB payload. Upon indication of a payload decoding failure, the WTRU may make an adjustment in its payload transmission parameters at 506. For example, a WTRU may make a change in one or more of MCS, payload power, PUSCH resources, or the like. The WTRU may not make any adjustments in its preamble part of msgA.

If the gNB fails in detecting both the preamble and the payload, then at 504 the WTRU processes the NACK transmitted alone or scrambled with the reserved 2RA-RNTI for preamble NACK.

Upon indication of the preamble decoding failure, the WTRU may make an adjustment in its preamble transmission parameters at 505. For example, a WTRU may make a change in one or more of the preamble sequence, preamble power, TA, or the like. The WTRU may not make any adjustments in its payload part of msgA.

In either case of the NACK type being preamble or payload, after the adjustments, the WTRU may then re-attempt the 2-step RACH process at 507.

Figure 6:
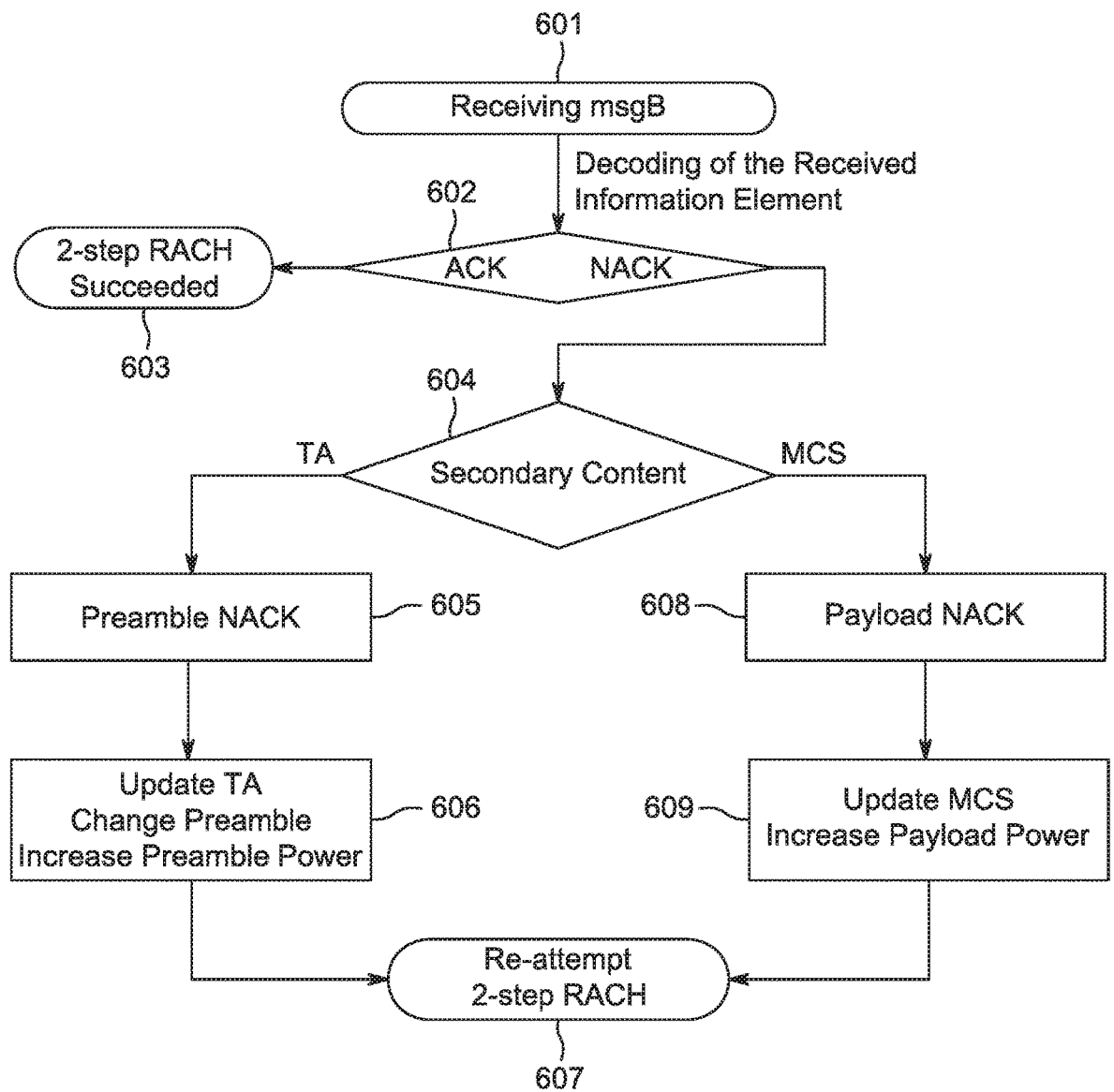
FIG. 6 is a flow diagram illustrating an example of WTRU behavior for an efficient ACK/NACK process.

FIG. 6 is a flow diagram illustrating an example of WTRU behavior for an efficient ACK/NACK process. In one approach, instead of relying on having a different preamble or payload NACKs that may be distinguished through an RNTI, a WTRU may rely on one or more companion control information elements to distinguish between different NACK types. As shown in the figure, depending on the type of the companion content, (e.g., TA or MCS) two different outcomes may result. The presence of the companion control information provides updated values for TA and MCS in this example.

Initially, the gNB may receive msgA from a WTRU. Depending on the success of msgA transmission, at 601, the gNB may send a msgB back to the WTRU, where the WTRU may receive and decode different combinations of control information in msgB. The WTRU may use the combination of the received information as an implicit indication of other events. Specifically, at 602, the WTRU may determine whether there is an ACK or a NACK in the msgB by decoding the received information element.

If the gNB was able to decode the received information element, then the msgB contains an ACK, and there was a successful 2-step RACH 603.

At 604, if the WTRU receives a NACK along with new PUSCH scheduling information and/or MCS and/or power commands, then it may determine that preamble detection has been successful, but PUSCH (e.g., payload) detection has failed at 608; in the example shown, the WTRU received MCS. As such, at 609 a new set of PUSCH resources and updated MCS may be indicated for the next msgA PUSCH transmission. The WTRU may also increase the payload power. Adjustment of other parameters may be at the discretion of the WTRU.

At 604, if a WTRU receives a NACK along with a TA and/or preamble and/or power commands, then it may determine that preamble detection has not been successful at 605. As such, an updated TA, preamble change command, and a power command for the preamble may be indicated for the next msgA PUSCH transmission at 606. Adjustment of other parameters may be at the discretion of the WTRU (e.g., a new set of PUSCH resources, and MCS).

In either case, once the updates are indicated, the WTRU may re-attempt the 2-RACH at 607.

For contention-based 2-step RACH, once msgA, which comprises the random access preamble (e.g., PRACH) and data (e.g., msg3 including WTRU ID, RRC Connection Request, etc.) is transmitted, the WTRU may start the random access response (RAR) window at the first expected PDCCH monitoring occasion from the end of the msgA transmission. Within the RAR window, the WTRU may monitor for the PDCCH and the corresponding PDSCH associated with msgB.

In some cases, during the 2-step RACH procedure, the WTRU may assume that the gNB has successfully detected a Random Access Preamble within msgA (e.g., ACK for RACH preamble) but the msg3 information (i.e., the payload part) of msgA has not been successfully received (e.g., NACK for msg3) or contention resolution has not been successful if one or more of the following conditions is met: (i) The WTRU may detect a PDCCH associated with msgB carrying DCI format 1_0 with a CRC scrambled by an RA-RNTI, where if the gNB successfully receives msgA, then it may have already acquired the knowledge regarding the WTRU-ID and it may not need to address the WTRU using an RA-RNTI; (ii) The WTRU may detect a PDCCH associated with msgB but may not be able to successfully decode and detect the corresponding PDSCH carrying the WTRU contention resolution, timing advance, or the like (e.g., msg2 and msg4).

The detection of a PDCCH associated with msgB may be considered by the WTRU as an implicit signaling for the acknowledgment of the random access preamble from the gNB, or equivalently, partial msgA reception.

In some cases, the WTRU may examine the DCI fields associated with msgB and if the fields are set to pre-specified values (e.g., set to all '0's or '1'), then the WTRU may validate whether the Random Access Preamble in msgA (e.g., msg1) has been successfully detected and/or msg3 for 2-Step RACH has been successfully received.

In an example, validation for msgA successful reception for the detected DCI may be achieved if all or a subset of fields for the DCI format 1_0 associated with msgB are set, for example, according to Table-1 below. The WTRU may assume that it has detected a PDCCH associated with msgB but has not successfully detected the scheduling information for the corresponding PDSCH carrying the contention resolution for 2-Step RACH.

TABLE-1

Special fields in DCI Format 1_0 for msgA successful reception validation

| DCI fields | Values |
|---|---|
| HARQ process number | set to all '0's or '1's |
| Redundancy version | set to all '0's or '1's |
| Modulation and coding scheme | set to all '0's or '1's |
| Frequency domain resource assignment | set to all '0's or '1's |
| Time domain resource assignment | set to all '0's or '1's |
| Downlink assignment index | set to all '0's or '1's |
| TPC command for scheduled PUCCH | set to all '0's or '1's |
| PUCCH resource indicator | set to all '0's or '1's |
| PDSCH-to-HARQ feedback timing indicator | set to all '0's or '1's |

Figure 7:
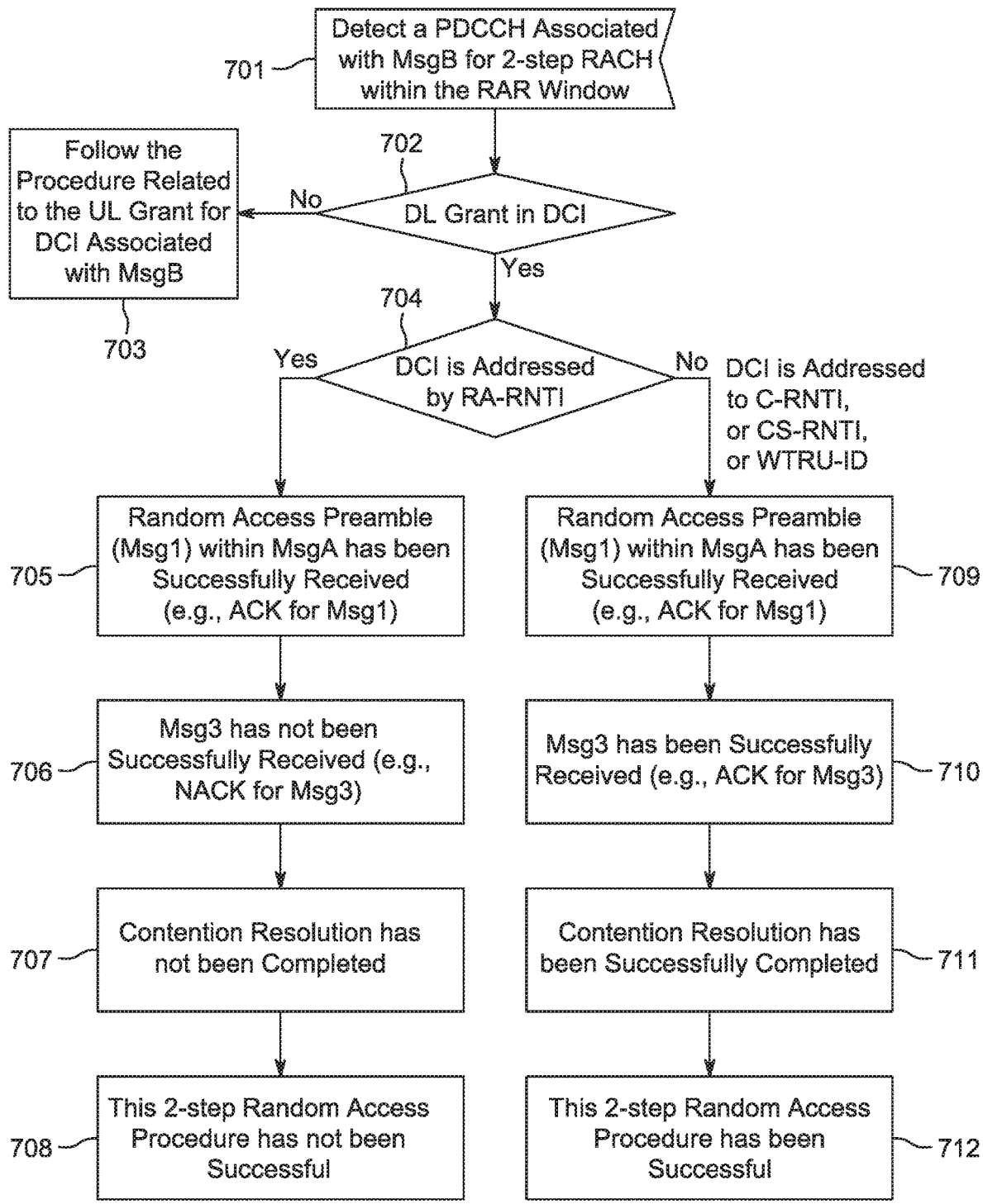
FIG. 7 is a flow diagram illustrating an example WTRU procedure associated with 2-step RA where the UE detects a DCI associated with MsgB within the RAR window which contains a DL assignment

FIG. 7 is a flow diagram illustrating an example WTRU procedure associated with the 2-step RACH where the WTRU detects a DCI associated with msgB within the RAR window that contains a downlink assignment. At 701, during the 2-step RACH procedure, the WTRU may detect a PDCCH associated with msgB within the RAR window. At 702, if the WTRU determines that a DL grant is not in the DCI, then at 703 the WTRU may follow the procedure related to the UL grant for DCI associated with msgB. At 702, if the DL grant is in the DCI, and the DCI is addressed by a RA-RNTI at 704 where WTRU successfully detects the corresponding PDSCH associated with msgB, then it may follow that: at 705, the Random Access Preamble transmitted in msgA has been successfully received (e.g., ACK for msg1); at 706, msg3 information (e.g., PUSCH payload) transmitted in msgA has not been received or detered (e.g., NACK for msg3); at 707, contention resolution for the WTRU is not completed (e.g., the WTRU contention resolution identity transmitted in msgB matches the WTRU ID transmitted in msgA); and/or, at 708 2-Step Random Access procedure has not been completed successfully.

At 704, if the DCI is not addressed RA-RNTI, but rather is addressed by an R-RNTI, C-RNTI, CS-RNTI or Temporary C-RNTI, and the WTRU successfully detects the corresponding PDSCH associated with msgB, then it may follow that: at 709, the WTRU may assume that the gNB has successfully detected the Random Access Preamble (e.g., msg1) transmitted in msgA; the detected and decoded msg3 information is successfully transmitted in msgA; contention resolution for the WTRU has been successfully completed (e.g., the WTRU contention resolution identity transmitted in msgB matches the WTRU ID transmitted in msgA); and/or, the 2-Step Random Access procedure has been completed successfully.

If the RAR window expires and the WTRU does not detect a PDCCH which is addressed to any of the RA-RNTI, C-RNTI, CS-RNTI, Temporary C-RNTI, or WTRU-ID, or if the WTRU does not correctly decode a corresponding transport block, the WTRU may assume that msgA has not been received by the gNB and the 2-Step Random Access procedure is unsuccessful (not shown). In this case, the WTRU may retransmit msgA while performing one or more of the following actions: increment the preamble transmission counter for msgA; select a new Random Access Preamble for msgA; select a random backoff time for retransmission of msgA after the backoff time; perform the 2-Step Random Access Resource selection procedure; flush the HARQ buffer used for transmission of the msg3; and/or, retransmit msgA.

In some cases, the WTRU may receive a flag in the DCI associated with msgB indicating to the WTRU whether msgA for 2-Step RACH has been fully or partially received at the gNB. If the WTRU successfully detects and decodes a PDCCH associated with msgB that is addressed to the RA-RNTI C-RNTI, CS-RNTI, Temporary C-RNTI or WTRU-ID within the RAR window, the WTRU may use the information in the DCI such as a new data indicator (NDI) (e.g., toggled or not toggled), to determine whether the entire msgA or part of msgA (e.g., the Random Access Preamble or msg3) has been successfully received at the gNB.

If the NDI in the DCI associated with msgB is not toggled, then the WTRU may assume that the entire msgA has not been successfully received at the gNB and the 2-step Random Access procedure is unsuccessful. In an example, if the NDI in the DCI associated with msgB is toggled, then the WTRU may assume that the entire msgA or a part of msgA has been successfully received at the gNB.

Figure 8:
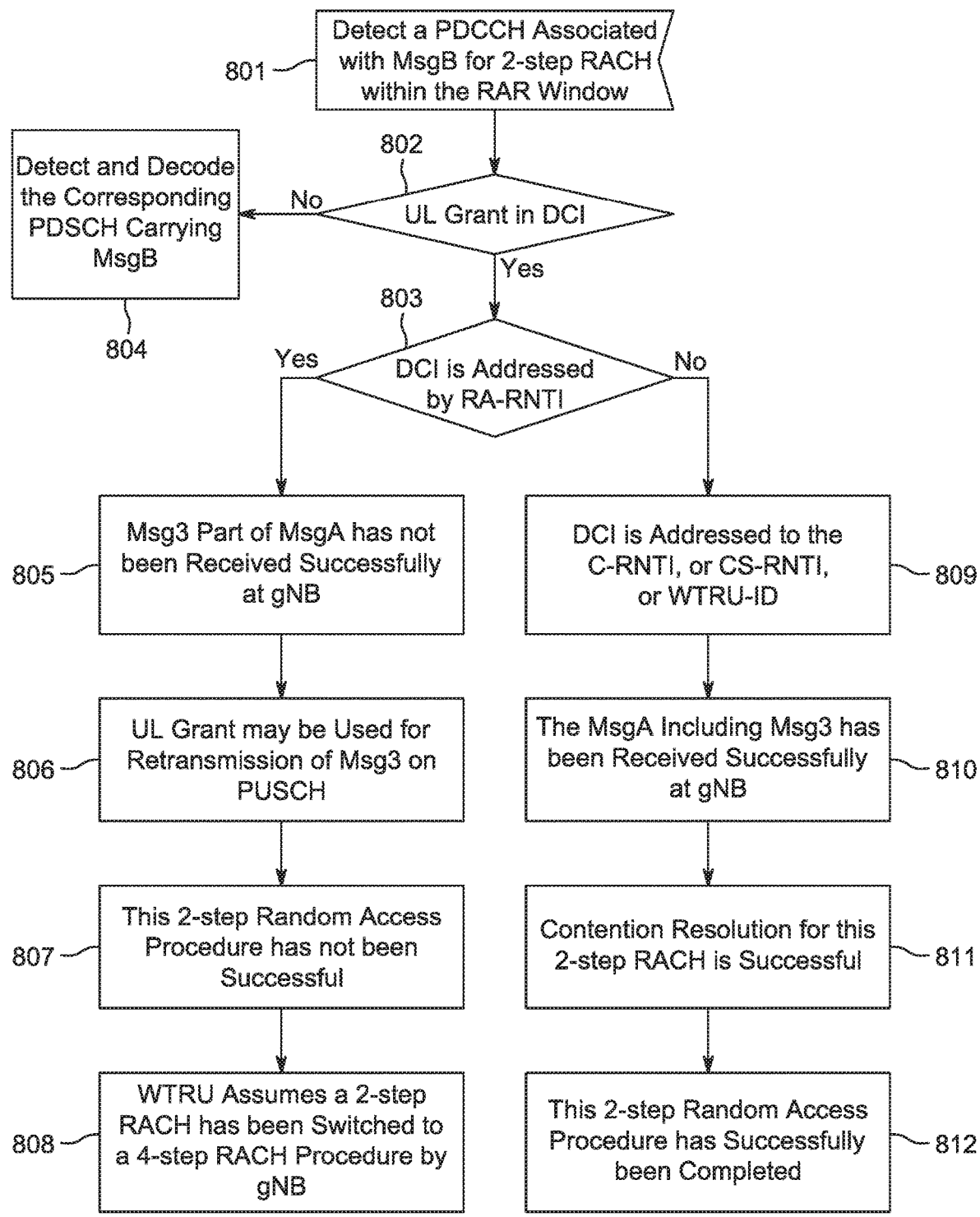
FIG. 8 is a flow diagram illustrating an example WTRU procedure associated with 2-step RA where the WTRU detects a DCI associated with msgB within the RAR window which contains an uplink grant.

FIG. 8 is a flow diagram illustrating an example WTRU procedure associated with a 2-step RACH where the DCI may contain an uplink grant. At 801, the WTRU detects a PDCCH, and receives DCI, associated with msgB within the RAR window. At 802, if the DCI does not contain an uplink grant, then at 804 the WTRU may detect and decode the corresponding PDSCH carrying the msgB. In some cases, at 802, the DCI does contain an uplink grant (e.g., DCI Format 0_1) rather than a downlink assignment associated with msgB (e.g., FIG. 7).

At 803, if the PDCCH associated with msgB carrying the uplink grant is addressed by the RA-RNTI, then following may apply: the msg3 information part of msgA has not received successfully at the gNB (e.g., HARQ NACK for msg3); uplink grant is for retransmission of msg3 on a PUSCH; this 2-Step Random Access procedure is unsuccessful; the gNB has switched the WTRU from a 2-Step RACH to a 4-Step RACH procedure.

At 803, if the PDCCH associated with msgB carrying the uplink grant is not addressed by the RA-RNTI, then the DCI may be addressed to the C-RNTI, CS-RNTI, or WTRU-ID at 809. It may follow then that: at 801, the msg3 information part of msgA has received successfully at the gNB (e.g., HARQ NACK for msg3); at 811, contention resolution for this 2-Step Random Access procedure is successful; and/or, at 812 this 2-Step Random Access procedure is successful.

In either case, the WTRU may determine what follows step 803 based on the determination made at 803.

Generally, the WTRU may detect a PDCCH and the corresponding PDSCH associated with msgB, and the PDSCH may explicitly indicate to the WTRU that the Random Access Preamble or msg3 information (e.g., or contention resolution) has not been received successfully at the gNB.

In NR with 4-step RACH, when a packet is transmitted from a WTRU on the PUSCH and is not successfully decoded at the gNB, the gNB may send a DCI format 0_1 with a CRC scrambled by a RA-RNTI to request a retransmission from the WTRU. If many WTRUs are involved in a 2-step RACH procedure simultaneously through common or shared PUSCH resources, one or more WTRUs may complete their msgA preamble PRACH transmission during the same time occasion but one or more WTRUs may fail in the payload transmission part of msgA. Several WTRUs may be expecting responses from the gNB through individual msgBs which may require a large downlink overhead. The msgA may be incorrectly received at the gNB due to either preamble collision or PUSCH detection failure.

In one approach, the contents of msgB may be interpreted differently depending on whether it is transmitted in a common or WTRU-specific search space. This may allow the gNB to reduce the amount of downlink signaling by addressing, separately, the issues of preamble and PUSCH detection failure.

WTRUs may interpret a msgB received on a group common search space as a preamble collision. Since a preamble collision affects multiple WTRUs, a group common search space may reduce the amount of signaling. When multiple WTRUs select the same preamble for msgA transmission, the gNB may detect the collision and may reply on the group common search space to trigger a preamble reselection procedure.

If the gNB does not detect a preamble collision, but the payload portion of msgA of one or more WTRUs fails, then the msgB may be sent on a WTRU-specific search space. The WTRU-ID used by the gNB to transmit on the WTRU-specific search space may be derived from the preamble.

Since a WTRU may not necessarily be time-aligned when transmitting a data payload part of msgA, a gNB may be able to decode the preamble but not the PUSCH part of msgA. Therefore, it may be beneficial for the WTRU to fall back to a 4-step RA procedure in certain cases. The WTRU may switch to a 4-step RA procedure and proceed with the transmission of a msg3 if an uplink grant is provided, and/or select a RACH occasion and a preamble associated with a 4-step RA procedure for msg1 retransmission after it switches to 4-step RA procedure. In some cases, the WTRU may switch from a 4-step to a 2-step RA procedure.

In some cases, a WTRU may switch between 2-step RA and 4-step RA based on reception of legacy MAC RAR content in msgB or a legacy msg2 PDU. For example, if a WTRU receives a random access preamble ID (RAPID) and a legacy MAC RAR subPDU, the WTRU may switch to 4-step RA. The WTRU may consider the reception of a legacy msg2 PDU as a trigger for fallback if it does not receive a msgB PDU associated with a msgA transmission in a 2-step RA procedure.

In some cases, a WTRU may switch between 2-step RA and 4-step RA based on the content of msgB or MAC RAR for 2-step RA. For example, if the content of a msgB includes an uplink grant, the WTRU may switch to 4-step RA. An explicit bit in the content of a msgB may be used to indicate switching to 4-step RA. For example, if a reserved bit "R" in the MAC RAR payload is flagged with a value such as "1", the WTRU may switch to 4-step RA. In an example, if a reserved bit "R" in a backoff MAC subPDU payload is flagged with a value such as "1", the WTRU may switch to 4-step RA.

In some cases, a WTRU may switch between 2-step RA and 4-step RA based on reception of only a RAPID MAC subPDU in msgB. For example, if the content of a msgB only includes a MAC subheader with RAPID, the WTRU may switch to 4-step RA.

In some cases, a WTRU may switch between 2-step RA and 4-step RA based on reception of a backoff indication MAC subPDU in msgB, or only a backoff indication MAC subPDU in msgB. For example, if the content of msgB only includes a MAC subheader with backoff and a reserved bit in the MAC subPDU is flagged, with a value such as "1", the WTRU may switch to 4-step RA.

In some cases, a WTRU may switch between 2-step RA and 4-step RA based on a property of a PDCCH scheduling msgB. For example, if msgB is received on a specific coreset, search space, and/or RNTI, the WTRU may switch between 2-step and 4-step RA. When separate RACH occasions are configured for 2-step and 4-step RACH, and a WTRU receives a msgB on a PDCCH addressed to a RA-RNTI associated with a RACH occasion for 4-step RA, the WTRU may switch to 4-step RA, or visa-versa which would result in switching to a 2-step RA. The WTRU may monitor an RA-RNTI associated with fallback to 4-step RA and another RA-RNTI, or C-RNTI if it was included in msgA, for continuation with 2-step RA. If the WTRU included its C-RNTI in msgA, and msgB is scheduled on a PDCCH addressed to the WTRU's C-RNTI, the WTRU may continue the RA procedure as 2-step RA. If the WTRU included its C-RNTI in msgA, and msgB is scheduled on a PDCCH addressed to the RA-RNTI associated with the RACH occasion (RO) on which the preamble was last transmitted, the WTRU may switch between 2-step RA and 4-step RA.

When 2-step RA and 4-step RA are configured to share ROs, the WTRU may be configured with separate coreset(s), search spaces(s), and/or RA-RNTI(s) to distinguish between RARs intended for legacy WTRUs and RARs intended for WTRUs supporting 2-step RA. If a fallback RAR, or legacy MAC RAR or a msg2 RAR, is received on a coreset, search space, and/or RA-RNTI not associated with 2-step RA, the WTRU may switch back to 4-step RA. In such an example, the WTRU may monitor the coreset, search space, and/or RA-RNTI associated with fallback to 4-step RA in addition to those configured for 2-step RA, if it has selected a PRACH resource associated with 2-step RA.

In some cases, a WTRU may switch between 2-step RA and 4-step RA based on timing advance. In an example, if a timing alignment timer expires, the WTRU may switch between 2-step and 4-step RA. In another example, if a timing advance (TA) command received in the MAC RAR and/or the indicated TA value or the TA adjustment difference is larger than a configured TA threshold, the WTRU may switch between 2-step and 4-step RA.

In some cases, a WTRU may switch between 2-step RA and 4-step RA based on RRC mode. For example, a WTRU may monitor conditions for falling back or switching between to 2-step RACH and 4-step RA if it is not in connected mode and/or if it has not provided a C-RNTI part of the msgA payload.

In some cases, a WTRU may switch between 2-step RA and 4-step RA based on RA counters. The WTRU may switch between 2-step RA and 4-step RA based on a value of a "msgA counter" and/or a preamble transmission counter that the WTRU maintains as part of a given RA procedure. In an example, the WTRU may maintain an additional new counter "msgA counter" that may be incremented for each 2-step RA attempt and may be reset when a new procedure starts or when the WTRU switches to 2-step RA. In an example, the WTRU may switch to 4-step RA if the msgA counter is larger than a threshold that may be configured by RRC, and/or the preamble transmission counter is larger than a threshold that may be configured by RRC. The WTRU may report a problem to higher layers or trigger RLF if the msgA counter is larger than a threshold that may be configured by RRC, and/or the preamble transmission counter is larger than a threshold that may be configured by RRC.

In an example, the WTRU may switch between 2-step RA and 4-step RA if a counter associated with counting LBT failures for msgA has reached a threshold that may be configured by RRC. For example, the MAC entity may receive an indication from the physical layer each time LBT fails for transmission of msgA, the preamble part of msgA, and/or the payload part of msgA. The WTRU may then maintain counting the number of LBT failure indications received from the physical layer to determine whether to switch between 4-step and 2-step RA.

In some cases, a WTRU may switch between 2-step RA and 4-step RA based on uplink transmit power or RF conditions. For example, the WTRU may switch between 2-step RA and 4-step RA if a power headroom is less than a configured value, or if a power ramping counter has reached a certain value that may be configured by RRC.

In some cases, A WTRU may switch between 2-step and 4-step RA based on channel measurements (e.g., measured by the WTRU and/or the network device, such as the gNB). For example, if the Reference Signal Receive Power (RSRP), Reference Singal Received Quality (RSRQ), and/or Received Signal Strength Indicator (RSSI) are larger than a threshold, the WTRU may switch between 2-step and 4-step RA.

Upon switching between 2-step RA and 4-step RA, the WTRU may proceed with the transmission of msg3 on a provided uplink grant. The WTRU may reset a msgA counter after a period of time or a number of 4-step attempts configured by RRC. The WTRU may reset a preamble transmission counter and/or a power ramping counter.

When a mapping of multiple RACH occasions to one PUSCH resource is configured, a gNB may decode a PUSCH but not the RACH, and the gNB may transmit a msgBindicating 2-step RA success for at least one WTRU for which an identity was decoded in the data payload part of msgA, though the gNB may not have decoded which RACH occasion was used by such WTRU(s). When a mapping of more than one RACH occasion to one PUSCH resource is configured, the WTRU may monitor a PDCCH for msgB on all RA-RNTIs associated with the RACH occasions mapped to the selected PUSCH resource for msgA. The WTRU may receive a msgB concluding the success of the 2-step RA on a RA-RNTI different from that associated with the selected RACH occasion for msgA.

Upon selection of a RACH occasion and/or a preamble configured for 2-step RA, the WTRU may monitor a PDCCH for reception of msg2 for fallback, in addition to msgB. The WTRU may monitor a PDCCH for msgB and msg2 on different coresets, search spaces, and/or RA-RNTIs, dependent on an RRC configuration. In an example, a WTRU may monitor the coreset and/or the RA-RNTI(s) associated with msg2 reception after a certain number of 2-step RA attempts, or when the conditions for using 2-step RA are no longer applicable (e.g., if the channel conditions/measurements are below a threshold, or if uplink timing is misaligned).

In some cases, a WTRU may be configured with two initial sets of backoff values and/or backoff scaling factors by RRC. For example, upon reception of a BI subPDU in msgB, the WTRU may apply one set of backoff values, if msgA was transmitted and/or a RACH occasion/preamble configured for 2-step RA was selected. The WTRU may apply a second set of backoff values if msg1 was transmitted and/or a RACH occasion/preamble configured for 2-step RA was selected.

The WTRU may implicitly determine an alternate backoff value from the indicated Backoff Indicator (BI) value as a function of at least one of the following: properties of received msgB; msgB contents; msgA contents; RA initiation trigger; and/or, whether the WTRU transmitted a data payload (e.g., whether msg1 vs. msgA was transmitted). For example, the WTRU may ignore the indicated backoff, scale it, or apply an alternate value mapped to the indicated BI if the WTRU has included its C-RNTI part of msgA and/or if the BI was received on a PDCCH addressed to the C-RNTI to a subset of RA-RNTIs. In another example, the WTRU may ignore the indicated backoff, scale it, or apply an alternate value mapped to the indicated BI, if it sent a data payload part of msgA and/or the data payload in msgA is from a Logical Channel (LCH) of a Logical Channel Prioritization (LCP) priority higher than a configured threshold. In another example, the WTRU may ignore the indicated backoff, scale it, or apply an alternate value mapped to the indicated BI if it has sent a preamble and/or selected a RACH occasion configured for 2-step RA and/or if the BI was received on a PDCCH associated with RA-RNTIs corresponding to RACH occasions configured for 2-step RA. The WTRU may apply an alternate backoff value, as described above, on an indication bit in the backoff subPDU.

In some cases, the WTRU may ignore subPDUs containing a RAPID or legacy msg2 PDUs if the WTRU has sent a preamble, selected a RACH occasion configured for 2-step RA, transmitted a payload on PUSCH part of msgA, and/or the WTRU has included a C-RNTI part of msgA content. The WTRU may consider a 2-step RA to be successful if it receives a MAC RAR subPDU that includes the WTRU's identity included in msgA content for contention resolution. The WTRU may consider subPDUs containing a RAPID or legacy msg2 PDUs for fallback to 4-step RA if no other MAC RAR subPDU is received with the WTRU identity included in the payload of msgA. If an uplink grant is received in a MAC RAR associated with a 2-step RA attempt, the WTRU may further consider the 2-step RA procedure successful when an ACK is determined or received for the PDU transmitted on that uplink grant. The WTRU may ignore uplink skipping for such an uplink grant, even if the WTRU has no buffered data to transmit.

Figure 9:
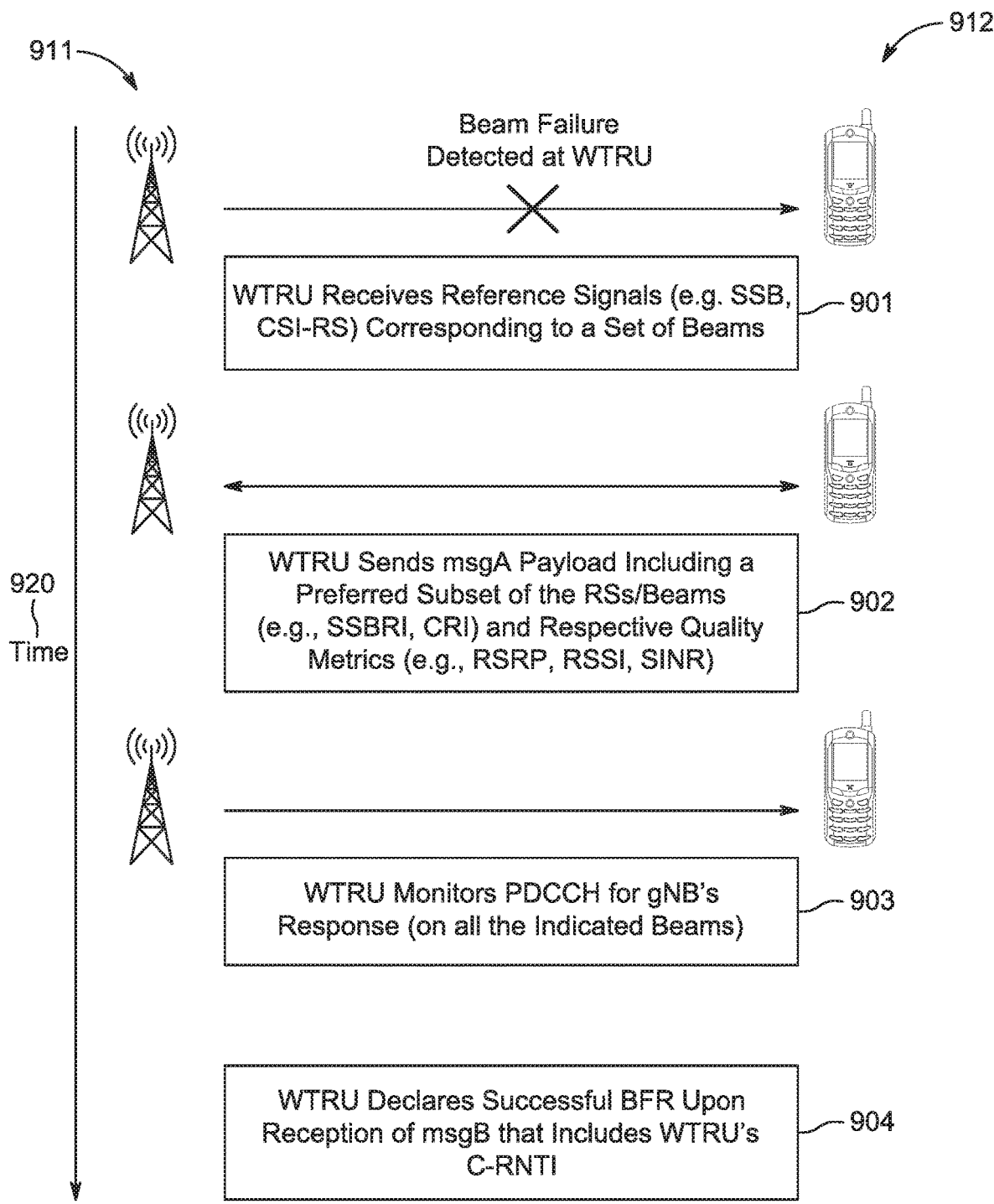
FIG. 9 is a process diagram illustrating an example of beam failure recovery with multiple beam monitoring.

FIG. 9 is a process diagram illustrating an example of a Beam Failure Recovery (BFR) procedure with multiple beam monitoring.

Generally, a WTRU may perform BFR using a 2-step RA procedure. The 2-step RA procedure may be contention-based. In a part of the msgA data payload, the WTRU may include an identity of the preferred SSB(s) and/or the preferred Channel State Information Reference Signals (CSI-RS)(s). The number of reported preferred identities may be preconfigured by RRC or predetermined. The WTRU may select any RACH occasion and/or preamble configured for 2-step RA regardless of the Synchronization Signal Block (SSB) to RACH occasion and/or preamble mapping configured if the WTRU provides the identity or identities of the preferred SSB(s) and/or CSI-RS(s). In a part of the msgA data payload, the WTRU may include measurements associated with the preferred beam(s). For example, the WTRU may include the payload of msgA RSRP, RSSI, Signal to Noise plus Interference Ratio (SINR), Block Error Rate (BLER), or Bit Error Rate (BER) measurements.

Upon the expiration of a BFR timer, the WTRU may exclude selecting SSB(s) and/or CSI-RS(s) selected prior to the expiration of the timer part of the RA procedure. The WTRU may fall back to 4-step RA, or Contention Based Random Access (CBRA) upon expiration of the timer. Upon the expiration of the timer, the WTRU may consider a specific set of PUSCH resources for transmitting the payload of msgA.

If an uplink grant is received in a MAC RAR associated with a 2-step RA attempt, the WTRU may consider the BFR procedure successful when an ACK is determined or received for the PDU transmitted on that uplink grant. If no uplink grant is provided in the MAC RAR, the WTRU may consider the BFR procedure successful when msgB is successfully received with the WTRU's C-RNTI (or identity provided in msgA) included in part of msgB content and/or when the WTRU successfully receives a PDCCH addressed to its C-RNTI.

As shown in the BFR example of FIG. 9, at 901 a WTRU 912 may detect a beam failure from the network/gNB 911. After a beam failure, the WTRU may monitor a PDCCH search space where a Transmission Configuration Indication (TCI) associated with the search space may be from a set of already configured reference signal (RS) resources (e.g., SSB, or CSI-RS). The RS resources set may comprise an RS group that may be configured for monitoring after beam failure detection. The RS resources set may contain the same or different set of RSs that the WTRU was monitoring prior to beam failure. Each RS may be associated with a set of preambles and each RS may correspond to a different beam.

In some cases, when detecting beam failure, a WTRU may choose to send a preamble associated to one of the RSs to indicate which downlink beam to use for a gNB response. The WTRU may determine a preferred subset of RSs based on a measured signal quality (e.g., RSRP, SINR) being above a configured threshold. At 902, the WTRU may send a msgA payload to the gNB, where the WTRU may include the preferred subset in the msgA payload. The payload may also include the measured signal quality metric, or the ranking of measurements, such as from the strongest to weakest RS.

The indication of the RS in the preferred subset may comprise one or multiple CSI-RS Resource Indices (RI) (CRIs), or SSBRIs. The WTRU may also include in the msgA payload the quality measurements (e.g., RSRP, SINR) of the RS in the preferred subset. For example, the preferred subset may comprise SSB1 and SSB2 which the gNB may send in a TDM manner. The WTRU may send the preamble for msgA associated to SSB1 and the msgA payload may contain the RSRP measurement of SSB1 along with SSBR1 of SSB2 with the RSRP measurement of SSB2 (e.g., at 902). The gNB may receive the msgA preamble and it may decode the msgA payload to determine if the WTRU included a preferred subset of RSs.

In some cases, if the payload includes additional RS indices, the gNB may decide to send a msgB response on either of the RSs by relying on the same spatial filter as, for example, SSB1 or SSB2. The gNB may determine the RS to use from WTRU assistance based on the indices received in msgA. If the payload does not include any additional indices, the gNB may send the msgB response by relying on the RS (e.g., beam) associated with the msgA preamble.

At 903, the WTRU may monitor for a PDCCH transmission on a configured RS resource associated with all the indicated beams. This may correspond to a search space or CORESET associated with the RS where the msgA preamble is sent. The WTRU may monitor for the PDCCH on any of the search spaces or CORESETs associated to the RSs reported in the msgA payload. The WTRU may stop monitoring PDCCHs after it detects a msgB response.

For example, the WTRU may monitor for a response related to the SSB1 or on the SSB2 transmission occasions. At 904, the BFR procedure may be considered successful and complete when the WTRU decodes a msgB that contains the WTRU's C-RNTI. In some instances, the PDCCH may be addressed using a common RNTI (e.g., DCI scrambled with RA-RNTI) and the WTRU may decode the msgB to determine if its C-RNTI is included in the msgB payload. The PDCCH may contain an indication of available time/frequency resources for PUCCH transmission. The WTRU may use the PUCCH resources to send (e.g., declare) a UCI containing an ACK acknowledging the reception of the msgB confirming the beam failure recovery procedure is complete.

As previously discussed herein, a WTRU may send a msgA to a gNB and receive a msgB from the gNB in response to the msgA. The WTRU may determine whether contention resolution is successful based on the msgB response.

The msgB may comprise a DCI scrambled with a msgB-RNTI. The WTRU may monitor for the msgB DCI to determine if the gNB included a payload in a PDSCH. After decoding the DCI, the WTRU may determine the PDSCH resources which contain the msgB payload. The WTRU may decode the payload and the WTRU may search for its user identity to determine if contention resolution is successful.

If the contention resolution is successful, the WTRU may send a HARQ-ACK response on a PUCCH resource.

The WTRU may determine a PUCCH resource based on a PUCCH resource index. The PUCCH resource index may be determined based on a PUCCH resource indicator (PRI) and a PDSCH-to-HARQ_feedback indicator which may be included as part of the DCI payload (for example, in DCI format 1_0 or DCI format 1_1) included in the msgB.

The PDSCH-to-HARQ_feedback indicator may map to a value from the set {1, 2, 3, 4, 5, 6, 7, 8} corresponding to a slot offset from PDSCH reception. The WTRU may determine the timing of the slot to transmit the PUCCH resource.

The PUCCH resource index is defined as Equation 1

$$r_{PUCCH} = \begin{cases} \left\lfloor \frac{n_{CCE,p} \cdot \lceil R_{PUCCH}/8 \rceil}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases} \quad \text{Equation 1}$$

Where $r_{PUCCH}$ is the PUCCH resource index, $R_{PUCCH}$ is the size of PUCCH resource list, $N_{CCE,p}$ is a number of CCEs in CORESET p of the PDCCH reception for the DCI format 1_0 or DCI format 1_1, $n_{CCE,p}$ is the index of a first CCE for the PDCCH reception, and $\Delta_{PRI}$ is a value of the PUCCH resource indicator field in the DCI format 1_0 or DCI format 1_1.

The WTRU may determine the parameters of a PUCCH transmission based on the PUCCH resource index.

$R_{PUCCH}$, $N_{CCE,p}$, p, and $n_{CCE,p}$ may be RRC configured values and may not be WTRU specific. $\Delta_{PRI}$ may be explicitly included in the DCI to WTRU-specifically define PUCCH resource. If the msgB payload includes only one WTRU, the single PRI and PDSCH-to-HARQ_feedback indicator values included in the DCI may uniquely determine the PUCCH resource for the WTRU. However, if more than one WTRU is multiplexed into msgB, more than one WTRU may receive the same DCI addressed to a msgB-RNTI and may use the single PRI and PDSCH-to-HARQ_feedback indicator to determine the PUCCH resource, which may be the same for all WTRUs. This may cause a collision and the HARQ-ACK feedback may not be received at the gNB.

In one approach, a WTRU may implicitly determine a PUCCH resource index based on a random access preamble index or identifier (RAPID) and/or PRI. The WTRU may determine the PUCCH resource index as a function of the same parameters from Equation 1, and also using the RAPID as follows:

msgA and may multiplex the response to multiple WTRUs in one msgB. The DCI may contain a single PRI value addressed to multiple WTRUs. If the contention resolution is successful, the WTRU may use the RAPID to randomize the $r_{PUCCH}$ selection. Each WTRU may link to a unique $r_{PUCCH}$ value determined by the RAPID and may transmit the HARQ-ACK without a collision.

The link between RAPID and a PUCCH resource may be configured such that it is a one-to-one mapping. A WTRU specific $r_{PUCCH}$ value may be generated where the RAPID may be the seed input to a generator function. A WTRU specific $\Delta_{PRI}$ may be generated where the RAPID may be the seed input to a generator function.

In some cases, a WTRU may determine a slot timing of a PUCCH feedback implicitly based on a PDSCH-to-HARQ_feedback indicator and a RAPID. Similarly to the PUCCH resource index, the WTRU may use the RAPID to randomize the slot timing that may avoid collisions based on a single PDSCH-to-HARQ feedback indicator.

The link between RAPID and PDSCH-to-HARQ_feedback indicator may be configured such that it is one-to-one. A WTRU-specific PDSCH-to-HARQ_feedback indicator value may be generated where the RAPID may be the seed input to a generator function.

The WTRU may determine $r_{PUCCH}$, PDSCH-to-HARQ_feedback indicator, or both based on the above. For example, the PDSCH-to-HARQ_feedback indicator may be a single value taken from the DCI and the $r_{PUCH}$ may be determined using the PRI and RAPID. Multiple WTRUs $$r_{PUCCH} = \begin{cases} \left\lfloor \frac{n_{CCE,p} \lceil R_{PUCCH}/8 \rceil}{N_{CCE,p}} \right\rfloor + (\text{RAPID} \bmod (\Delta_{PRI}+1)) \left\lceil \frac{R_{PUCCH}}{8} \right\rceil & \text{if } \Delta_{PRI} < R_{PUCCH} \bmod 8 \\ \left\lfloor \frac{n_{CCE,p} \lfloor R_{PUCCH}/8 \rfloor}{N_{CCE,p}} \right\rfloor + (\text{RAPID} \bmod (\Delta_{PRI}+1)) \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

In one approach, a WTRU may implicitly determine a PUCCH resource index based on a RAPID and PRI. The WTRU may determine the PUCCH resource index as a function of the same parameters from Equation 1, and also using the RAPID as follows:

may transmit in the same time slot but on different PUCCH resources. Similarly, the same PRI may be used by multiple users on different time slots with a PDSCH-to-HARQ_feedback indicator generated by a WTRU specifically using the RAPID.

$$r_{PUCCH} = \begin{cases} \left\lfloor \frac{n_{CCE,p} \lceil R_{PUCCH}/8 \rceil}{N_{CCE,p}} \right\rfloor + f(\text{RAPID}, \Delta_{PRI}) \left\lceil \frac{R_{PUCCH}}{8} \right\rceil & \text{if } \Delta_{PRI} < R_{PUCCH} \bmod 8 \\ \left\lfloor \frac{n_{CCE,p} \lfloor R_{PUCCH}/8 \rfloor}{N_{CCE,p}} \right\rfloor + f(\text{RAPID}, \Delta_{PRI}) \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

Where $f(\text{RAPID}, \Delta_{PRI})$ is a mapping from the RAPID and $\Delta_{PRI}$ to a WTRU specific PRI.

The RAPID may serve to randomize the $r_{PUCCH}$ value. For example, multiple WTRUs may select different preambles and send msgA. msgB may successfully receive all Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

As discussed herein, A WTRU, UE, and user may be used interchangeably. A gNodeB and a gNB may be used interchangeably. A reference symbol may be used to denote a symbol such as a complex number that is fixed and known and used as a pilot. A reference signal may be used to denote a time domain signal that is generated after processing the reference symbols. For example, in OFDM, reference symbols are the complex numbers that are fed into an IDFT block while a reference signal is the output of the IDFT block. Downlink control information (DCI) is a set of bits that are transmitted over a PDCCH for a user or a group of users. A resource element (RE) is one OFDM symbol on one subcarrier, and a resource element group (REG) refers to a group of REs which are used as building blocks of control channel element (CCE) which assign resource elements to a user. Adjacent REGs in time or frequency that are grouped together and their associated precoder is the same are called REG bundles. NR-REG, NR-CCE, and NR-PDCCH may refer to REG, CCE, and PDCCH for the NR in 5G. A control resource set (CORESET) is a set of resource elements used for a downlink control channel, configured by its frequency resources and its length in time (e.g., in terms of symbols) and the type of its REG bundles. A search space, or a set of search spaces, is a set of PDCCH candidates that are monitored by a WTRU or a group of WTRUs during blind detection of a PDCCH. As discussed herein, the word some may mean one, a plurality, or all.

What is claimed is:

1. A method implemented by a wireless transmit receive unit (WTRU) for beam failure recovery (BFR), the method comprising:
   receiving information indicating a set of reference signals corresponding to a set of beams;
   detecting beam failure associated with transmitting or receiving with a serving cell;
   determining information indicating a subset of the set of reference signals based on one or more measurements;
   transmitting a first message including a preamble and a payload, wherein the payload includes an index of each reference signal in the subset of the set of reference signals; and
   receiving a second message, wherein the second message is a random access response to the first message, wherein the second message includes a physical downlink control channel (PDCCH) transmission addressed to a cell radio network temporary identity (C-RNTI) of the WTRU, wherein the inclusion of the C-RNTI in the second message indicates that beam failure recovery was successful, wherein the second message is monitored for on at least one beam associated with the first message.

2. The method of claim 1, wherein the reference signals are synchronization signal blocks (SSBs) or channel status information reference signals (CSI-RSs).

3. The method of claim 1, wherein the first message is transmitted based on the detection of the beam failure on the serving cell as part of a random access procedure for beam failure recovery.

4. The method of claim 1, wherein determining the subset of the set of reference signals is further based on the one or more measurements meeting a threshold value, wherein the one or more measurements relate to signal quality.

5. The method of claim 1, further comprising sending a feedback message for the second message on a feedback resource, wherein the second message further includes an indication of the feedback resource.

6. The method of claim 1, wherein the second message is a DCI message.

7. The method of claim 1, wherein the second message is denoted as MsgB and the first message is denoted as MsgA.

8. A wireless transmit receive unit (WTRU) comprising:
   a processor operatively connected to a transceiver, the processor and transceiver configured to receive information indicating a set of reference signals corresponding to a set of beams;
   the processor and transceiver configured to detect beam failure associated with transmitting or receiving with a serving cell;
   the processor and transceiver configured to determine information indicating a subset of the set of reference signals based on one or more measurements;
   the processor and transceiver configured to transmit a first message including a preamble and a payload, wherein the payload includes an index of each reference signal in the subset of the set of reference signals; and
   the processor and transceiver configured to receive a second message, wherein the second message is a random access response to the first message, wherein the second message includes a physical downlink control channel (PDCCH) transmission addressed to a cell radio network temporary identity (C-RNTI) of the WTRU, wherein the inclusion of the C-RNTI in the second message indicates that beam failure recovery was successful, wherein the second message is monitored for on at least one beam associated with the first message.

9. The WTRU of claim 8, wherein the reference signals are synchronization signal blocks (SSBs) or channel status information reference signals (CSI-RSs).

10. The WTRU of claim 8, wherein the first message is transmitted based on the detection of the beam failure on the serving cell as part of a random access procedure for beam failure recovery.

11. The WTRU of claim 8, wherein determining the subset of the set of reference signals is further based on the one or more measurements meeting a threshold value, wherein the one or more measurements relate to signal quality.

12. The WTRU of claim 8, wherein the processor and transceiver are configured to send a feedback message for the second message on a feedback resource, wherein the second message further includes an indication of the feedback resource.

13. The WTRU of claim 8, wherein the second message is a DCI message.

14. The WTRU of claim 8, wherein the second message is denoted as MsgB and the first message is denoted as MsgA.

\* \* \* \* \*